May 18, 1965
O. A. KERSHNER
3,184,003
BRAKE STRUCTURE
Filed May 15, 1961
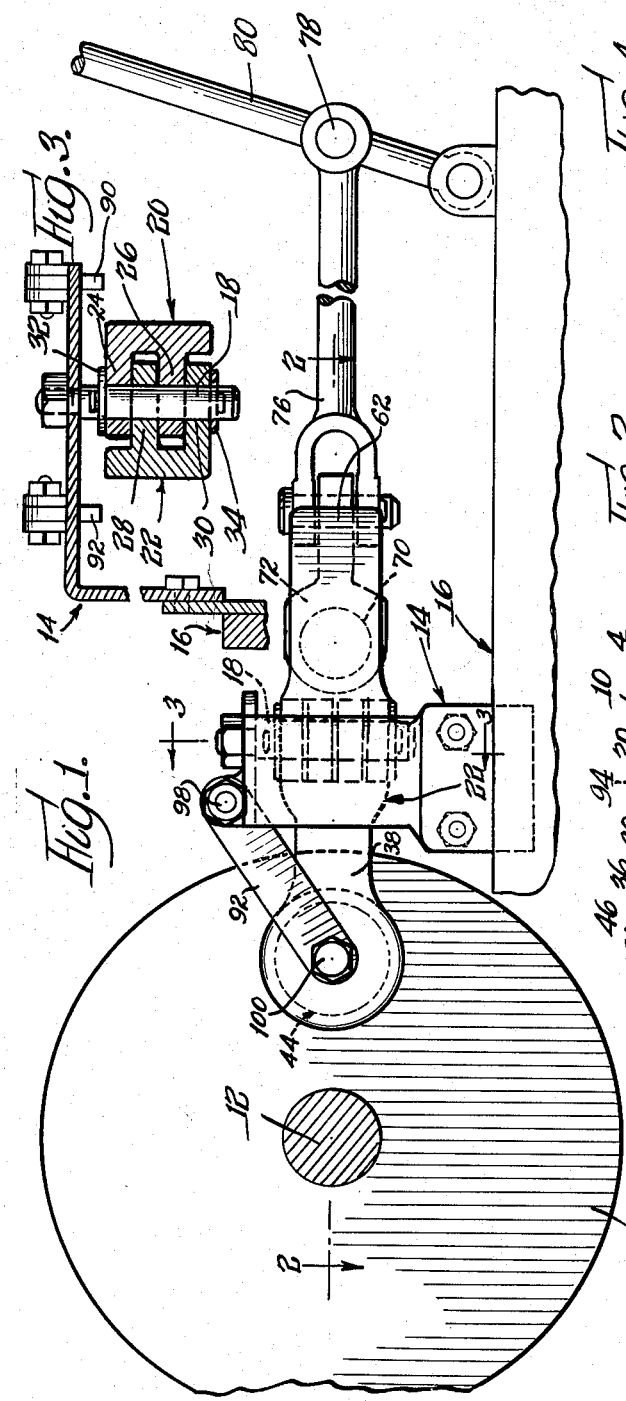
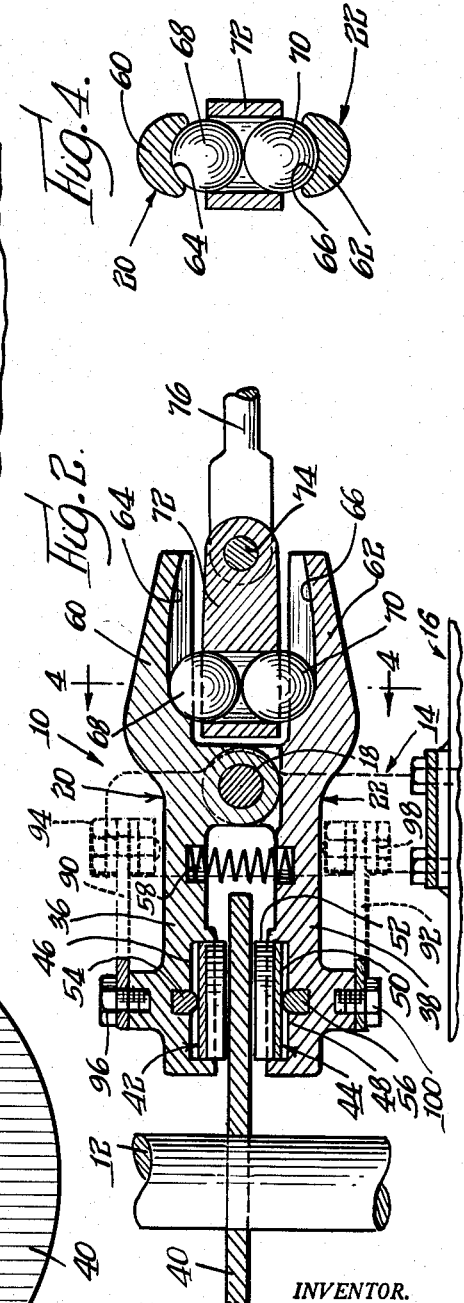
INVENTOR.
Osborn A. Kershner
BY Olson, Trexler
Wolters & Bushnell
Attys.

United States Patent Office 3,184,003
Patented May 18, 1965

3,184,003
BRAKE STRUCTURE
Osborn A. Kershner, St. Joseph, Mich., assignor, by mesne assignments, to Lambert Brake Corporation, St. Joseph, Mich., a corporation of Michigan
Filed May 15, 1961, Ser. No. 110,071
5 Claims. (Cl. 188—73)

The present invention relates to a novel control mechanism, and more specifically to a novel structure for braking or controlling a movable or rotatable member.

An important object of the present invention is to provide a novel relatively small and highly efficient brake mechanism susceptible for use in a variety of different installations and particularly suitable for use in small vehicles such as golf carts, go-carts and the like.

A further object of the present invention is to provide a novel brake mechanism of the above described type which may be easily and smoothly actuated.

Still another object of the present invention is to provide a novel brake structure which may be relatively simply and economically produced. A further object of the present invention is to provide a novel brake mechanism of the above described type which is of rugged and long lasting construction.

Other objects and advantages of the present invention will become apparent from the following description and the accompanying drawings wherein:

FIG. 1 is a fragmentary elevational view showing a brake unit incorporating features of the present invention installed for controlling a rotatable shaft;

FIG. 2 is a fragmentary sectional view taken generally along line 2—2 in FIG. 1;

FIG. 3 is a fragmentary sectional view taken along line 3—3 in FIG. 1; and

FIG. 4 is a sectional view taken along line 4—4 in FIG. 2.

Referring now more specifically to the drawings wherein like parts are designated by the same numerals throughout the various figures, a brake structure or unit 10 incorporating features of the present invention is shown in FIGS. 1 and 2 in association with a rotatable shaft 12 which is to be controlled. It is apparent that the shaft 12 could be a part of numerous different types of apparatus and could for example, be a drive shaft or a rotatable axle in a small vehicle such as a golf cart or a go-cart. The unit 10 is mounted by means of a bracket 14 to a fixed frame generally designated by the numeral 16 of the apparatus or vehicle with which the unit is associated.

A pin 18 is fixed to and supported by the bracket 14 so that the axis of the pin is disposed in a plane arranged perpendicularly with respect to the axis of the shaft 12. The pin 18 pivotally supports a pair of pincher arms 20 and 22. As shown in FIGS. 1-3, intermediate portions of the arms 20 and 22 respectively include apertured ears 24-26 and 28-30 which receive the pivot pin 18. Suitable washers 32 and 34 or other bearing elements are fixed on the pin 18 at opposite sides of the arms 20 and 22 for retaining the arms on the pin. The pincher arms 20 and 22 respectively include first end portions 36 and 38 extending in generally parallel relationship from their respective associated apertured ears and generally toward the shaft 12. A friction disc 40 is welded or otherwise fixed to the shaft 12 for rotation therewith, which disc is disposed so as to project between the closely spaced apart arm portions 36 and 38. Friction pads 42 and 44 are respectively carried by the arm portions 36 and 38 for releasable engagement with the friction disc 40 in the manner described in detail below.

As shown in FIGS. 1 and 2, the arm portion 36 is provided with a circular seat 46 adjacent its outer or free end for accommodating the friction disc 42 and the arm portion 38 is provided with a similar circular seat 48 for accommodating the round friction disc 44. Each of the friction discs 42 and 44 comprises a rigid circular backing plate 50 preferably formed from metal and a circular pad 52 formed from any suitable friction material and adhesively bonded to or otherwise fixed to the backing plate 50. The friction discs 42 and 44 respectively abut bearing or pivot elements 54 and 56 centrally located in and projecting from the bottom surfaces of the seats 46 and 48. In addition, the friction discs are formed so that their diameters are similar to but slightly less than the diameters of the seats 46 and 48 so that the friction discs may rock or pivot on the bearing elements 54 and 56 in a manner which enables the friction discs to assume positions parallel to the opposite flat side surfaces of the friction disc 40 when the pincher arms are manipulated or pivoted in the manner described below. Thus, full surface contact is promoted between the friction discs 42 and 44 and the friction plate 40 so as to obtain maximum braking effectiveness.

The pincher arm portions 36 and 38 are normally maintain in the relatively spread apart or open position shown in FIG. 2 so that the friction discs 42 and 44 are disengaged from the friction plate 40 and the shaft 12 is free to rotate. A compression spring 58 is provided between the arm portions 36 and 38 for resiliently biasing them toward the open position.

In order to energize the brake structure, the pincher arms 20 and 22 are pivoted so that the arm portions 36 and 38 move toward each other and the friction discs 42 and 44 are clamped against opposite sides of the friction plate 40. It will be noted that when the arms are pivoted in this manner, the portions 36 and 38 will be inclined relative to each other. However, as discussed above, the friction discs 42 and 44 are retained so they will pivot or swivel within the seats 46 and 48 for full surface contact with the friction plate 40. The brake unit 10 incorporates means for relatively pivoting the arms 20 and 22 in a manner which enables the friction discs 42 and 44 to be easily and smoothly as well as aggressively and uniformly clamped against opposite sides of the friction plate for promoting a proper and efficient braking action. More specifically, the arm members 20 and 22 respectively include end portions 60 and 62 extending oppositely from the end portions 36 and 38. The end portions 60 and 62 are respectively provided with directly opposed elongated cam surfaces or ball seats 64 and 66. As shown in FIG. 2, the cam surfaces 64 and 66 are relatively inclined so that they approach each other toward the outer or free ends of the arm portions 60 and 62. Cooperable cam means is shiftably disposed between the arm portions 60 and 62 for engagement with the surfaces 64 and 66. This means comprises ball elements 68 and 70 retained in abutting relationship with each other and with the seats 64 and 66 respectively by a cage member 72. The cage member is in turn pivotally connected by pin 74 with a link 76 which is pivoted as at 78 with a suitable operating member 80 such as a foot pedal or hand lever.

The brake unit may be readily energized by pulling the lever 80 in a clockwise direction as viewed in FIG. 1 so that the ball elements 68 and 70 are pulled toward the right as viewed in FIGS. 1 and 2. It will be apparent that as the ball elements move along the inclined cam surfaces 64 and 66, the pincher arms 20 and 22 will be pivoted in the manner described above, so that friction discs 42 and 44 will be clamped against the plate. It is to be noted that as the balls advance toward the outer or free ends of the cam surfaces, the balls will have substantially rolling contact both with the cam surfaces and with each other so that easy and smooth operation of the unit is promoted. It will also be noted that as the balls move along the cam surfaces 64 and 66 and away from the pivot pin 18, the effective mechanical advantage of the brake unit will increase so that a progressively greater clamping action may be obtained with the same force applied to the operating lever 80. If desired, the mechanical advantage of the unit may be modified by curving the cam surfaces 64 and 66 such as in the manner shown in FIG. 2.

It will be appreciated that during a braking operation, a substantial torque will be created by the frictional engagement of the rotating plate 40 with the friction pads at the ends of the arms 20 and 22 which tends to pivot the arms around an axis extending transversely with respect to the pin 18. If desired, means may be provided for substantially relieving the pin 18 of this torque. In the embodiment shown, this means comprises links 90 and 92. The link 90 has one end connected at 94 to an ear of the bracket 14 and an opposite end connected at 96 to an outer end of the arm portion 36. The torque link 92 is similarly connected at 98 to the bracket 14 and at 100 to an outer end of the arm 38.

While the preferred embodiment of the present invention has been shown and described herein, it is obvious that many structural details may be changed without departing from the spirit and scope of the appended claims.

The invention is claimed as follows:

1. In a brake structure for controlling a rotatable member having opposite sides, the combination comprising a pair of members pivoted for movement about a common predetermined axis, means including a mounting bracket and pivot pin means carried thereby pivotally supporting said pivoted members, said members including first portions for embracing said rotatable member, friction means on said portions for frictionally engaging said rotatable member, means for pivoting said pivoted members for releasably urging said friction means against said rotatable member, and a pair of generally flat elongated strap-like links having first ends respectively connected with said portions of said pivoted members on mounting axes parallel to the axis of rotation of said rotatable member and opposite ends connected to said bracket on mounting axes parallel to the axis of rotation of said rotatable member for resisting torque tending to twist said pivoted members transversely of said first mentioned axis resulting from engagement of said friction means with said rotatable member during a braking operation, said strap-like links having flat sides and narrow edges and being disposed with flat sides thereof facing said portions of the pivoted members for enabling the links to flex with the pivoted members when said pivoted members are moved toward and away from the rotatable member during a braking operation.

2. A brake structure, as defined in claim 1, wherein said pivoted members include second opposed portions and apertured portions between said first and second portions receiving said pivot means, and said means for pivoting said pivoted members includes means shiftably disposed for engagement with said second opposed portions for moving said second opposed portions with respect to each other and thereby pivoting the pivoted members.

3. A brake structure, as defined in claim 1, wherein said friction means on said portions comprises a pair of friction pads respectively carried by and shiftable relative to said portions for frictionally engaging opposite sides of said movable member with full surface contact.

4. A brake structure, as defined in claim 2, wherein said means shiftably disposed for engagement with said second opposed portions comprises a pair of ball elements abutting each other and respectively abutting said second opposed portions, and shiftable cage means retaining said ball elements.

5. A brake structure, as defined in claim 2, wherein said second opposed end portions include oppositely facing cam surfaces converging toward outer free ends of said second opposed end portions, and said shiftable means being engageable with said cam surfaces.

References Cited by the Examiner

UNITED STATES PATENTS

| 343,680 | 6/86 | Tribe | 188—73 |
| 526,317 | 9/94 | Hendrick et al. | 188—26 |
| 2,138,837 | 12/38 | Cadman | 188—164 |
| 2,785,710 | 3/57 | Mowery | 188—73 |
| 2,827,132 | 3/58 | Buyze | 188—73 |
| 2,983,338 | 5/61 | Vansteenkiste | 188—73 |
| 2,988,176 | 6/61 | Du Bois | 188—73 |
| 3,003,589 | 10/61 | Desbrow | 188—73 |
| 3,027,982 | 4/62 | Butler | 188—73 |

FOREIGN PATENTS

| 47,286 | 12/36 | France. |
| 1,169,939 | 9/58 | France. |
| 1,237,699 | 6/60 | France. |

ARTHUR L. LA POINT, *Primary Examiner.*

A. JOSEPH GOLDBERG, EUGENE G. BOTZ,
*Examiners.*